United States Patent
Iyer et al.

(10) Patent No.: US 10,931,548 B1
(45) Date of Patent: Feb. 23, 2021

(54) COLLECTING HEALTH MONITORING DATA PERTAINING TO AN APPLICATION FROM A SELECTED SET OF SERVICE ENGINES

(71) Applicant: VMware, Inc., Palo Alto, CA (US)

(72) Inventors: Sreeram Iyer, Cupertino, CA (US); Aditya Somasundara, Milpitas, CA (US); Raju Kumar, San Jose, CA (US); Praveen Yalagandula, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 339 days.

(21) Appl. No.: 15/453,258

(22) Filed: Mar. 8, 2017

Related U.S. Application Data

(60) Provisional application No. 62/314,285, filed on Mar. 28, 2016.

(51) Int. Cl.
*H04L 12/26* (2006.01)
*H04L 29/08* (2006.01)
*H04L 12/24* (2006.01)

(52) U.S. Cl.
CPC .......... *H04L 43/06* (2013.01); *H04L 41/0803* (2013.01); *H04L 67/10* (2013.01); *H04L 67/34* (2013.01)

(58) Field of Classification Search
CPC ..... G06F 7/00; G06F 9/44; G06F 9/46; G06F 9/52; G06F 9/455; G06F 9/505; G06F 9/5011; G06F 9/5016; G06F 9/5077; G06F 9/5083; G06F 9/5088; G06F 9/45545; G06F 9/45558; G06F 11/00; G06F 11/07; G06F 11/20; G06F 11/165; G06F 11/0709; G06F 11/0712; G06F 11/0745; G06F 11/0772;
(Continued)

(56) References Cited

U.S. PATENT DOCUMENTS

| 5,109,486 A | 4/1992 | Seymour |
| 5,781,703 A | 7/1998 | Desai et al. |

(Continued)

OTHER PUBLICATIONS

Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.
(Continued)

*Primary Examiner* — Robert B Harrell
(74) *Attorney, Agent, or Firm* — Adeli LLP

(57) ABSTRACT

In an embodiment, a method includes selecting, among service engines (SEs) executing on a respective plurality of hosts, a set of one or more SEs to perform health monitoring of an application, where a plurality of instances of the application are executing on at least some of the hosts, and the selected SE(s) includes a subset of the SEs. The method includes collecting health monitor data from the selected SE(s), determining a health condition based at least in part on the collected data, and outputting the health condition. In another embodiment, a method includes receiving, at a first SE of a first host among a plurality of hosts, configuration information pertaining to a subset of application instances executing on corresponding ones of the plurality of hosts, obtaining health data pertaining to the subset of application instances, and outputting the health data to be shared by the plurality of hosts.

23 Claims, 6 Drawing Sheets

(58) Field of Classification Search
CPC ............ G06F 11/0781; G06F 11/0793; G06F 11/0766; G06F 11/1469; G06F 11/1471; G06F 11/1641; G06F 11/2028; G06F 11/2038; G06F 11/3409; G06F 11/3419; G06F 11/3466; G06F 11/3476; G06F 11/3616; G06F 11/3664; G06F 13/00; G06F 17/00; G06F 2201/81; G06F 2201/815; G06F 2201/865; G06F 2009/4559; G06Q 30/02; H04L 12/6418; H04L 29/06; H04L 29/0809; H04L 29/08072; H04L 29/08117; H04L 29/08144; H04L 29/08171; H04L 43/06; H04L 41/0803; H04L 67/10; H04L 67/34; H04L 12/26; H04L 12/24; H04L 29/08; H05K 999/99
USPC .......... 709/220; 714/2, 10, 11, 48; 717/127; 718/104, 105
See application file for complete search history.

(56) References Cited

U.S. PATENT DOCUMENTS

| | | | |
|---|---|---|---|
| 6,148,335 | A | 11/2000 | Haggard et al. |
| 6,449,739 | B1 | 9/2002 | Landan |
| 6,515,968 | B1 | 2/2003 | Combar et al. |
| 6,714,979 | B1 | 3/2004 | Brandt et al. |
| 6,792,458 | B1 | 9/2004 | Muret et al. |
| 6,792,460 | B2 | 9/2004 | Oulu et al. |
| 6,901,051 | B1 | 5/2005 | Hou et al. |
| 6,996,778 | B2 | 2/2006 | Rajarajan et al. |
| 7,076,695 | B2 | 7/2006 | McGee et al. |
| 7,130,812 | B1 | 10/2006 | Iyer et al. |
| 7,246,159 | B2 | 7/2007 | Aggarwal et al. |
| 7,353,272 | B2 | 4/2008 | Robertson et al. |
| 7,430,610 | B2 | 9/2008 | Pace et al. |
| 7,636,708 | B2 | 12/2009 | Garcea et al. |
| 7,933,988 | B2 | 4/2011 | Nasuto et al. |
| 7,990,847 | B1 | 8/2011 | Leroy et al. |
| 8,032,896 | B1 | 10/2011 | Li et al. |
| 8,112,471 | B2 | 2/2012 | Wei et al. |
| 8,588,069 | B2 | 11/2013 | Todd et al. |
| 8,856,797 | B1 | 10/2014 | Siddiqui et al. |
| 8,874,725 | B1 | 10/2014 | Ganjam et al. |
| 9,032,078 | B2 | 5/2015 | Beerse et al. |
| 9,210,056 | B1 | 12/2015 | Choudhary et al. |
| 9,288,193 | B1 | 3/2016 | Gryb et al. |
| 9,459,980 | B1 | 10/2016 | Arguelles |
| 9,467,476 | B1 | 10/2016 | Shieh et al. |
| 9,477,784 | B1 | 10/2016 | Bhave et al. |
| 9,483,286 | B2 | 11/2016 | Basavaiah |
| 9,495,222 | B1 | 11/2016 | Jackson |
| 9,531,614 | B1 | 12/2016 | Nataraj et al. |
| 9,571,516 | B1 | 2/2017 | Curcic et al. |
| 9,608,880 | B1 | 3/2017 | Goodall |
| 9,613,120 | B1 | 4/2017 | Kharatishvili et al. |
| 9,626,275 | B1 | 4/2017 | Hitchcock et al. |
| 9,674,302 | B1 | 6/2017 | Khalid et al. |
| 9,680,699 | B2 | 6/2017 | Cohen et al. |
| 9,692,811 | B1 | 6/2017 | Tajuddin et al. |
| 9,697,316 | B1 | 7/2017 | Taylor et al. |
| 9,712,410 | B1 | 7/2017 | Char et al. |
| 9,716,617 | B1 | 7/2017 | Ahuja et al. |
| 9,729,414 | B1 | 8/2017 | Oliveira et al. |
| 9,749,888 | B1 | 8/2017 | Colwell et al. |
| 9,830,192 | B1 | 11/2017 | Crouchman et al. |
| 9,935,829 | B1 | 4/2018 | Miller et al. |
| 10,003,550 | B1 | 6/2018 | Babcock et al. |
| 10,212,041 | B1 | 2/2019 | Rastogi et al. |
| 10,313,211 | B1 | 6/2019 | Rastogi et al. |
| 10,372,600 | B2 | 8/2019 | Mathur |
| 10,547,521 | B1 | 1/2020 | Roy et al. |
| 10,594,562 | B1 | 3/2020 | Rastogi et al. |
| 10,728,121 | B1 | 7/2020 | Chitalia et al. |
| 2002/0078150 | A1 | 6/2002 | Thompson et al. |
| 2002/0198984 | A1 | 12/2002 | Goldstein et al. |
| 2002/0198985 | A1 | 12/2002 | Fraenkel et al. |
| 2003/0191837 | A1 | 10/2003 | Chen |
| 2003/0236877 | A1 | 12/2003 | Allan |
| 2004/0054680 | A1 | 3/2004 | Kelley et al. |
| 2004/0064552 | A1 | 4/2004 | Chong et al. |
| 2004/0103186 | A1 | 5/2004 | Casati et al. |
| 2004/0243607 | A1 | 12/2004 | Tummalapalli |
| 2005/0010578 | A1 | 1/2005 | Doshi |
| 2005/0060574 | A1 | 3/2005 | Klotz et al. |
| 2005/0108444 | A1 | 5/2005 | Flauaus et al. |
| 2005/0120160 | A1 | 6/2005 | Plouffe et al. |
| 2005/0172018 | A1 | 8/2005 | Devine et al. |
| 2005/0188221 | A1 | 8/2005 | Motsinger et al. |
| 2006/0167939 | A1* | 7/2006 | Seidman ............. G06F 11/3616 |
| 2006/0242282 | A1 | 10/2006 | Mullarkey |
| 2006/0271677 | A1 | 11/2006 | Mercier |
| 2007/0226554 | A1 | 9/2007 | Greaves et al. |
| 2008/0104230 | A1 | 5/2008 | Nasuto et al. |
| 2008/0126534 | A1 | 5/2008 | Mueller et al. |
| 2009/0154366 | A1 | 6/2009 | Rossi |
| 2009/0199196 | A1 | 8/2009 | Peracha |
| 2010/0279622 | A1 | 11/2010 | Shuman et al. |
| 2011/0126111 | A1 | 5/2011 | Gill et al. |
| 2011/0196890 | A1 | 8/2011 | Pfeifle et al. |
| 2012/0101800 | A1 | 4/2012 | Miao et al. |
| 2012/0110185 | A1 | 5/2012 | Ganesan et al. |
| 2012/0254443 | A1 | 10/2012 | Ueda |
| 2013/0013953 | A1* | 1/2013 | Eck ...................... G06F 9/45545 714/2 |
| 2013/0086230 | A1* | 4/2013 | Guerra ................ H04L 12/6418 709/220 |
| 2013/0086273 | A1 | 4/2013 | Wray et al. |
| 2013/0179289 | A1 | 7/2013 | Calder et al. |
| 2013/0179881 | A1 | 7/2013 | Calder et al. |
| 2013/0179894 | A1 | 7/2013 | Calder et al. |
| 2013/0179895 | A1 | 7/2013 | Calder et al. |
| 2013/0211559 | A1 | 8/2013 | Lawson et al. |
| 2013/0212257 | A1 | 8/2013 | Murase et al. |
| 2013/0343213 | A1 | 12/2013 | Reynolds et al. |
| 2013/0346594 | A1 | 12/2013 | Banerjee et al. |
| 2014/0006862 | A1 | 1/2014 | Jain et al. |
| 2014/0143406 | A1 | 5/2014 | Malhotra et al. |
| 2014/0173675 | A1 | 6/2014 | Ahmed et al. |
| 2014/0215058 | A1 | 7/2014 | Vicat-Blanc et al. |
| 2014/0215621 | A1 | 7/2014 | Xaypanya et al. |
| 2014/0229706 | A1 | 8/2014 | Kuesel et al. |
| 2014/0282160 | A1 | 9/2014 | Zarpas |
| 2014/0304414 | A1 | 10/2014 | Yengalasetti et al. |
| 2014/0344439 | A1 | 11/2014 | Kempf et al. |
| 2015/0058265 | A1 | 2/2015 | Padala et al. |
| 2015/0074679 | A1 | 3/2015 | Fenoglio et al. |
| 2015/0081880 | A1 | 3/2015 | Eaton et al. |
| 2015/0124640 | A1 | 5/2015 | Chu et al. |
| 2015/0199219 | A1 | 7/2015 | Kim et al. |
| 2015/0212829 | A1 | 7/2015 | Kupershtok et al. |
| 2015/0288682 | A1 | 10/2015 | Bisroev et al. |
| 2015/0293954 | A1 | 10/2015 | Hsiao et al. |
| 2015/0295780 | A1 | 10/2015 | Hsiao et al. |
| 2015/0295796 | A1 | 10/2015 | Hsiao et al. |
| 2015/0358391 | A1 | 12/2015 | Moon et al. |
| 2015/0370852 | A1 | 12/2015 | Shastry et al. |
| 2016/0064277 | A1 | 3/2016 | Park et al. |
| 2016/0094431 | A1 | 3/2016 | Hall et al. |
| 2016/0094483 | A1 | 3/2016 | Johnston et al. |
| 2016/0105335 | A1 | 4/2016 | Choudhary et al. |
| 2016/0127204 | A1 | 5/2016 | Ozaki et al. |
| 2016/0164738 | A1 | 6/2016 | Pinski et al. |
| 2016/0182399 | A1 | 6/2016 | Zadka et al. |
| 2016/0217022 | A1 | 7/2016 | Velipasaoglu et al. |
| 2016/0294722 | A1 | 10/2016 | Bhatia et al. |
| 2016/0323377 | A1 | 11/2016 | Einkauf et al. |
| 2017/0041386 | A1 | 2/2017 | Bhat et al. |
| 2017/0063933 | A1 | 3/2017 | Shieh et al. |
| 2017/0093986 | A1 | 3/2017 | Kim et al. |
| 2017/0134481 | A1 | 5/2017 | DeCusatis et al. |
| 2017/0331907 | A1 | 11/2017 | Jagannath et al. |
| 2018/0004582 | A1 | 1/2018 | Hallenstål |

(56) References Cited

U.S. PATENT DOCUMENTS

| | | |
|---|---|---|
| 2018/0018244 A1 | 1/2018 | Yoshimura et al. |
| 2018/0041408 A1 | 2/2018 | Dagum et al. |
| 2018/0041470 A1 | 2/2018 | Schultz et al. |
| 2018/0046482 A1 | 2/2018 | Karve et al. |
| 2018/0088935 A1 | 3/2018 | Church et al. |
| 2018/0089328 A1 | 3/2018 | Bath et al. |
| 2018/0136931 A1 | 5/2018 | Hendrich et al. |
| 2018/0287902 A1 | 10/2018 | Chitalia et al. |
| 2018/0309637 A1 | 10/2018 | Gill et al. |
| 2018/0335946 A1 | 11/2018 | Wu et al. |
| 2019/0123970 A1 | 4/2019 | Rastogi et al. |

OTHER PUBLICATIONS

Author Unknown, "Autoscaling," Aug. 20, 2015, 4 pages, Amazon Web Services, retrieved from http://web.archive.org/web/20150820193921/https://aws.amazon.com/autoscaling/.

Catania, V., et al., "PMT: A Tool to Monitor Performances in Distributed Systems," Proceedings of the 3rd IEEE International Symposium on High Performance Distributed Computing, Aug. 2-5, 1994, 8 pages, San Francisco, CA, USA.

Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.

De George, Andy, "How to Scale an Application," Jun. 16, 2015, 8 pages, Github.com.

Liu, Feng, et al., "Monitoring of Grid Performance Based-on Agent," 2007 2nd International Conference on Pervasive Computing and Applications, Jul. 26-27, 2007, 6 pages, IEEE, Birmingham, UK.

Non-Published commonly owned U.S. Appl. No. 15/055,450, filed Feb. 26, 2016, 37 pages, Avi Networks.

Non-Published commonly Owned U.S. Appl. No. 15/130,499, filed Apr. 15, 2016, 49 pages, Avi Networks.

Sevcik, Peter, et al., "Apdex Alliance," May 24, 2014, 5 pages, www.apdex.org.

Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.

Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.

Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

Non-Published commonly Owned U.S. Appl. No. 16/817,604, filed Mar. 12, 2020, 52 pages, VMware, Inc.

* cited by examiner

200

300

400

500

COLLECTING HEALTH MONITORING DATA PERTAINING TO AN APPLICATION FROM A SELECTED SET OF SERVICE ENGINES

CROSS REFERENCE TO OTHER APPLICATIONS

This application claims priority to U.S. Provisional Patent Application No. 62/314,285 entitled SCALABLE HEALTH MONITORING IN EAST WEST DEPLOYMENTS IN LARGE SCALE CLUSTERED ENVIRONMENTS filed Mar. 28, 2016 which is incorporated herein by reference for all purposes.

BACKGROUND OF THE INVENTION

Large-scale clustered environments host numerous servers, sometimes on the order of thousands of servers or more. The servers may be implemented using various virtual devices such as containers, virtual machines, and the like. It may be difficult to monitor the health of the servers and manage traffic among the servers in these environments. For example, the health of a cluster of servers is determined from various factors such as individual server health, application health, and network connectivity. Conventional techniques for monitoring a group of servers and providing a network service typically involve instantiating a service provider (e.g., a monitoring service) on each application server in the cluster of servers. For clustered environments with a large number of nodes, such deployments are computationally expensive and power intensive. Thus, there is a need in the art for effective health monitoring and traffic management for large-scale clustered environments.

BRIEF DESCRIPTION OF THE DRAWINGS

Various embodiments of the invention are disclosed in the following detailed description and the accompanying drawings.

DETAILED DESCRIPTION

Figure 1:
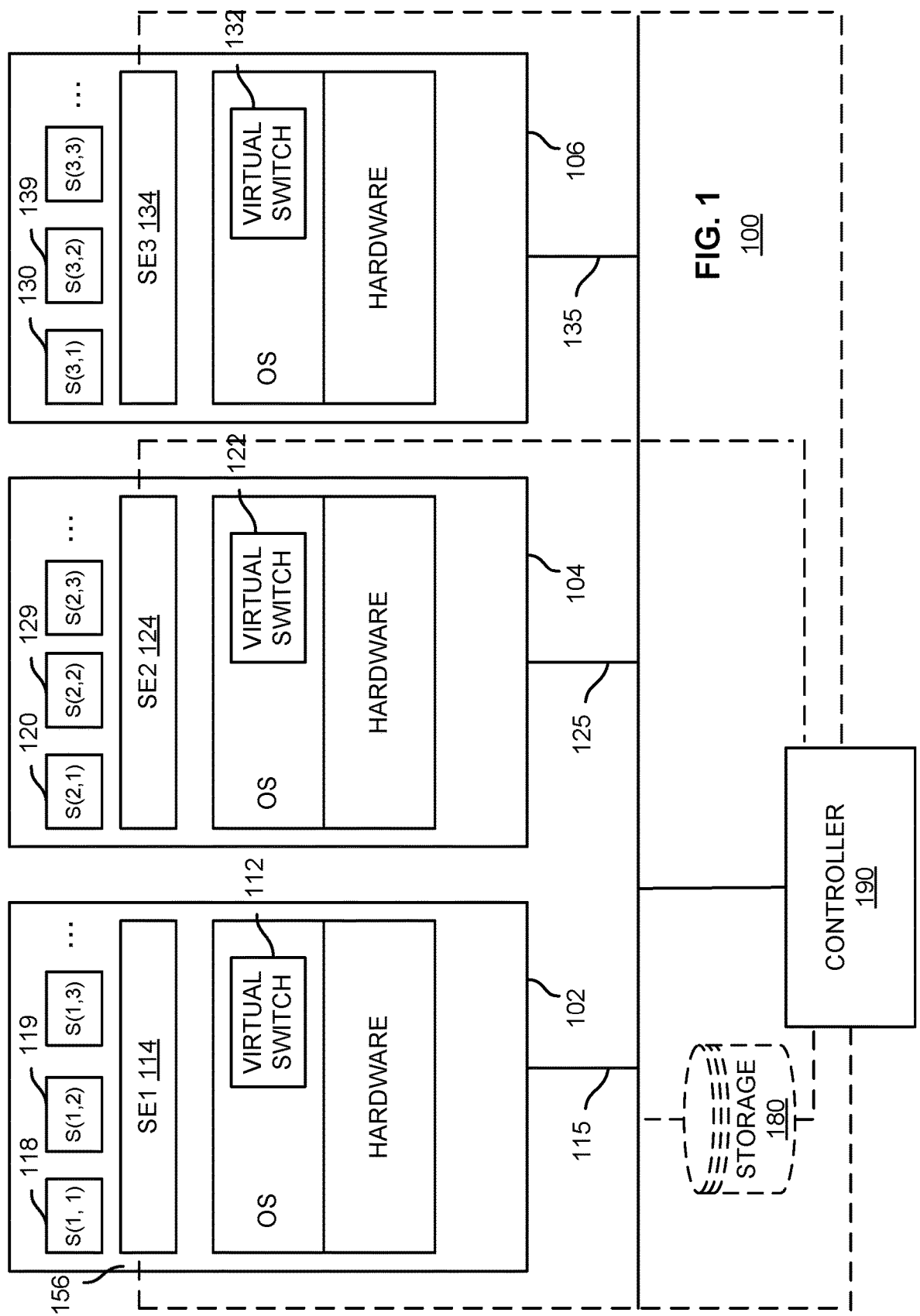
FIG. 1 is a block diagram illustrating an embodiment of a platform for monitoring health of constituent components and overall health of the platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional techniques for monitoring network health and managing network traffic includes centralized monitoring and de-centralized monitoring.

In centralized monitoring, the cluster environment includes a central controller and a local agent for each host. The central controller queries the local agent associated with a host and, in response, receives information about the health of the host from the respective local agent. However, this technique is unable to detect network connectivity issues in some instances. Suppose two hosts are each able to communicate with the central controller, but unable to communicate with each other. Under the conventional centralized monitoring scheme, the connectivity between the two hosts would not be detected because they each appear healthy to the central controller.

In decentralized monitoring, a controller is provided at each local host. A local host typically hosts a cluster or pool of servers. Using the example of load balancing, the controller is implemented as a load balancer. The load balancer load balances east-west traffic and monitors the health of the servers. East-west traffic refers to communications internal to a network such as traffic between backend application servers. Typically, the load balancer monitors not only the health of the servers provided in its respective host, but also the health of server provided on other hosts. Thus, any load balancer in this environment can detect network connectivity issues because the load balancer is aware of the health of all of the servers within the environment. For example, if there are m load balancers and n servers, then the number of checks performed is m×n. Thus, in a large-scale clustered environment, this represents a large load on the servers to respond to each query regarding its health as well as a high amount of traffic, making it impractical to use for most network traffic situations. Furthermore, generating such data is computationally expensive.

Techniques of the present disclosure provide health monitoring and traffic management in a clustered environment. In various embodiments, a service engine (e.g., a special process) provided on a host is configured to monitor its local application servers and selected application servers on other hosts. In various embodiments, the computational cost of this system is j×n, where n is the number of servers and j is a number less than the total number of application servers in the system. Thus, the computational cost of this system is less the computational cost of conventional health monitoring systems (m×n, where m is the number of service engines).

In various embodiments, a set of one or more service engines is selected from among a plurality of service engines executing on a respective plurality of hosts to perform health monitoring of an application. A plurality of instances of the application are executing on at least some of the plurality of hosts, and the set of one or more selected service engines includes a subset of the plurality of service engines. Health monitor data pertaining to the application from the selected set of one or more service engines is collected. A health condition based at least in part on the collected health monitor data is determined. The health condition is output.

In one aspect, health monitoring reflects operational characteristics of the environment and/or member nodes. This determination can be used to redirect traffic to those nodes that are more able to accommodate traffic than other nodes. Using the example of load balancers and servers, in case a load balancer loses connectively to a control plane, the service engine is configured to turn on health-monitoring for all servers deterministically to avoid black holing of traffic (e.g., in case any servers go down during the period the load balancer is not in contact with the control plane). The processes described herein are scalable and find application in large-scale clustered environments, including management of east-west traffic in such environments.

FIG. 1 is a block diagram illustrating an embodiment of a platform 100 for monitoring health of constituent components and overall health of the platform. Platform 100 is simplified for purposes of illustration. The processes described herein may be applied to other systems such as east-west deployments of large-scale clustered environments. Platform 100 implements a distributed service engine architecture with shared communication channels. In the example shown in FIG. 1, platform 100 includes a central controller 100, devices 102-106, and optional central storage 180.

In this example, platform 100 includes a number of devices (e.g., multiple server computers or a multicore server comprising multiple processing cores). A physical device (e.g., 102, 104, 106, etc.) has hardware components and software components, and may be implemented using a device such as system 200 shown in FIG. 2. The physical device is also referred to as a "host" or "node." Separate physical devices communicate with each other via communication interfaces such as ports, wireline or wireless network interface cards, etc. Although three systems are shown for purposes of illustration, the number of systems and the number of components within each system can vary in other embodiments.

In some embodiments, the devices include virtual machine (VM)-based systems. In a VM-based system, a number of virtual machines (VMs) such as 118, 119, etc. are configured to execute on the same device such as 102. A VM is a software implementation of a machine (e.g., a computer) that simulates the way a physical machine executes programs. Each VM executes its own operating system. Within the operating system, services are configured to execute as they would on a standard non-VM-based system. The VMs are also referred to as "application servers" or "applications." The part of the device's operation system that manages the VMs is referred to as the hypervisor. The hypervisor interfaces between the physical hardware and the VMs, providing a layer of abstraction for the VMs. Through its management of the VMs' sharing of the physical hardware resources, the hypervisor makes it appear as though each VM were running on its own dedicated hardware. Examples of hypervisors include VMware Workstation® and Oracle VM VirtualBox®.

In some embodiments, the devices include container-based systems. In a container-based system, multiple containers such as 118, 119, etc. are configured to execute on the same device such as 102, within the same operating system. Each container functions as a lightweight VM that can execute other programs. Examples of container-based systems include Kubernetes®, Docker®, Mesos®, etc.

In some embodiments, the devices include a combination of VM-based systems, container-based systems, and/or standard systems (e.g., non-VM-based systems and/or non-container-based systems).

In this example, clients (not shown) communicate with servers, which are configured to execute within VMs or containers to provide services (also referred to as target applications). Examples of such services include a website service, a shopping cart application, user authentication, credit card authentication, email service, file sharing service, virtual desktop, voice/video streaming, online collaboration, etc. Many other services can be implemented. A server (e.g., a web server, a credit card processing server, a database server, etc.) executes within a VM or container to provide a service, and multiple servers can execute on multiple VMs to provide the same service. For example, three separate servers execute within VMs or containers 118, 120, and 130 to provide the $1^{st}$ service; three separate servers execute within VMs or containers 119, 129, and 139 to provide the $2^{nd}$ service; etc.

In the example shown, inside the operating system, there are multiple modules providing different functionalities. One of the modules is a virtual switch (112, 122, 132, etc.). A physical device hardware has one or more physical ports (e.g., Ethernet ports). Network traffic (e.g., data packets) can be transmitted or received by any of the physical ports, to or from any VMs or containers. In some embodiments, the virtual switch is configured to direct traffic to and from one or more appropriate VMs or containers, such as the VM or container in which the service engine on the device is operating. In some embodiments, the virtual switch is configured to direct traffic to and from one or more VMs or containers depending on the health of the VMs or containers, relative health of the VMs and containers to each other, or overall network health.

Service engines 114, 124, and 134 (also referred to as SE1, SE2, and SE3, respectively) are instantiated on physical devices 102, 104, and 106, respectively. In some embodiments, a service engine is implemented as software executing in a virtual machine or container. The service engine is executed to provide distributed network services for processes executing on the same physical server as the service engine as well as for processes executing on different physical servers. Multiple service engines are configured to cooperate and provide the distributed network services. In some embodiments, the service engine is configured to enable appropriate service components that implement service logic. When a specific service is desired, a corresponding server is configured and invoked by the service engine to execute in a VM or container. In this example, the servers are denoted as S(i, j), where i represents the service engine identifier and j represents the service identifier. Thus, S(1, 1) indicates that the server corresponds to SE1 and the 1$^{st}$ service, S(2, 1) indicates that the server corresponds to SE2 and the 1$^{st}$ service, etc.

In various embodiments, the service engines includes an instantiation of an east-west load balancer. For example, an east-west load balancer is instantiated on each of the hosts 102, 104, 106 in the cluster. The load balancer is configured to, among other things, provide distributed load balancing, provide application maps, and support backend SSL services.

The service engine also gathers operational data for the services (e.g., numbers of open connections for the 1$^{st}$ service maintained by servers S(1, 1), S(2, 1), and S(3, 1), respectively; number of requests made to servers S(1, 1), S(2, 1), and S(3, 1), respectively; etc.). Note that the number of instances of servers providing a particular service can vary; for example, there can be multiple servers providing the 1$^{st}$ service on device 104 (in other words, multiple S(2, 1)'s can execute in multiple VMs on device 104). For example, service engine 114 monitors containers S(1,1), S(1,2), S(1,3), and selected containers of device 104 and 106. Details of how the service engine gathers operational data and interacts with controller 190 to monitor health and handle traffic are described herein in FIG. 4.

A virtual switch such as 112 interacts with the service engines, and uses existing networking Application Programming Interfaces (APIs) (such as APIs provided by the operating system) to direct traffic and provide distributed network services for services deployed on the network. The operating system and the services implement the networking API calls (e.g., API calls to send data to or receive data from a specific socket at an Internet Protocol (IP) address). In some embodiments, the virtual switch is configured to be in-line with one or more VMs or containers and intercepts traffic designated to and from instances of the services executing on the VMs or containers. When a networking API call is invoked, traffic is intercepted by the in-line virtual switch, which directs the traffic to or from the appropriate VM on which instances of the service execute. In some embodiments, a service engine sends data to and receives data from a server via the virtual switch.

Traffic received on a physical port of a server (e.g., a communications interface such as Ethernet port 115) is sent to the virtual switch (e.g., 112). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application.

A controller 190 is configured to control, monitor, program, and/or provision the services, virtual machines, and/or containers. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, collecting analytics information, and/or determining health indicator changes. The controller can be implemented as software, hardware, firmware, or any combination thereof. In this example, controller 190 determines a health condition of one or more servers and/or at overall health of at least a portion of the system with the assistance of service engines 114, 124, and 134. As will be described in greater detail below, the controller selects one or more service engines to perform health monitoring, collects health monitor data from the selected service engine(s), and determines the health condition based on the collected data.

In various embodiments, the controller is implemented by an orchestrator. The orchestrator may be configured to coordinate agents (e.g., service engines) on member devices in a system. For example, each of the devices 102-106 includes local agents that cooperate with an orchestrator to carry out various functions such as uploading, downloading, instantiating applications, health monitoring, and the like. In some instances, the orchestrator is a master that instructs agent-slaves to carry out the functions.

Optionally, platform 100 includes a central storage 180. In various embodiments, central storage 180 is configured to store information collected from one or more devices via communication channels 115, 125, and 135. The central storage 180 is accessible by controller 190 to determine health of components in the physical device(s) based on the collected information, determine overall network health, and the like. For example, the health state of the servers is published to the central storage, which published information is accessible by the service engines and the controller. For example, the shared database may be implemented by a Redis' system. Details of how storage 180 and controller 190 interact to store and/or collect health monitor data and determine a health condition based on the collected data are described herein in FIG. 3.

In operation, controller 190 selects one or more of the service engines 114, 124, 134 to perform health monitoring of VMs/containers S(1, 1), S(1, 2), S(1, 3), S(2, 1), S(2, 2), S(2, 3), S(3, 1), S(3, 2), and/or S(3, 3), where the number of service engines selected to perform health monitoring is fewer than all of the service engines. For example, controller 190 selects SE1 and SE2 to monitor container S(1, 1). The selected service engines, SE1 and SE2 collect and/or process health data and report this information back to controller 190. In some embodiments, the reported information is stored in storage 180 and other service engines may access storage 180 to obtain this health information. In some embodiments, the reported information is sent to controller 190, and the controller 190 determines what information to make available to other service engines. Based at least in part on the information provided by SE1 and SE2, controller 190 determines a health condition of at least a portion of the clustered environment. The controller 190 then outputs the determined health condition. Details of how the controller and the service engine interact to select service engines to perform health monitoring, collect health monitor data, and determine a health condition based on the collected data are described herein in FIGS. 3 and 4.

The modules described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules may be implemented on a single device or distributed across multiple devices. The functions of the modules may be merged into one another or further split into multiple sub-modules.

Figure 2:
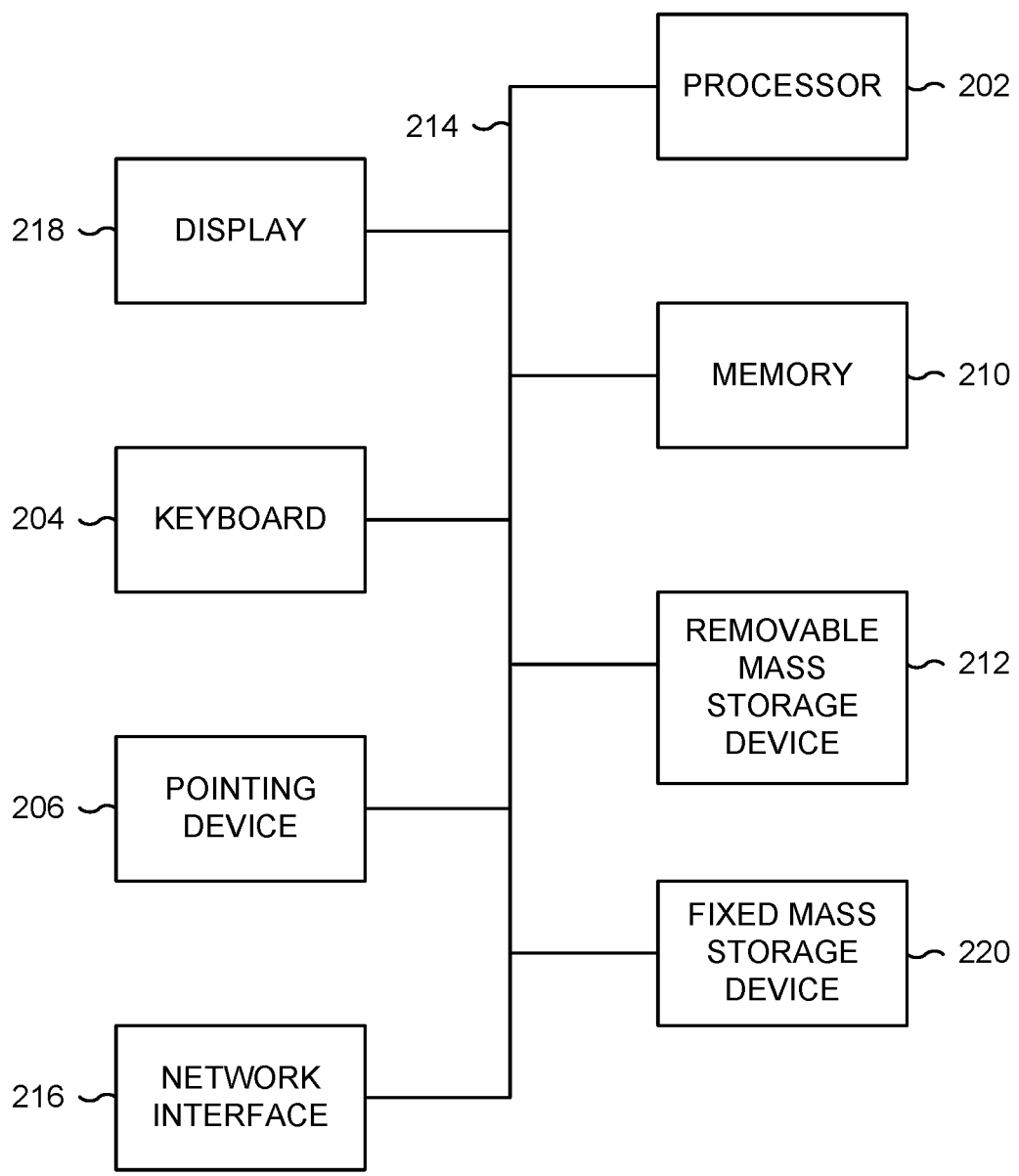
FIG. 2 is a functional diagram illustrating a programmed computer system for monitoring health in east-west deployments of large-scale cluster environments in accordance with some embodiments.

FIG. 2 is a functional diagram illustrating a programmed computer system for monitoring health in east-west deployments of large-scale cluster environments in accordance with some embodiments. As will be apparent, other computer system architectures and configurations can be used to perform health monitoring. Computer system 200, which includes various subsystems as described below, includes at least one microprocessor subsystem (also referred to as a processor or a central processing unit (CPU)) 202. For example, processor 202 can be implemented by a single-chip processor or by multiple processors. In some embodiments, processor 202 is a general purpose digital processor that controls the operation of the computer system 200. Using instructions retrieved from memory 210, the processor 202 controls the reception and manipulation of input data, and the output and display of data on output devices (e.g., display 218). In some embodiments, processor 202 is used to provide controller 190 or service engine 114, 124, 134 described herein with respect to FIG. 1 and/or performs the processes described below with respect to FIGS. 3 and 4.

Processor 202 is coupled bi-directionally with memory 210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 202. Also as is well known in the art, primary storage typically includes basic operating instructions, program code, data and objects used by the processor 202 to perform its functions (e.g., programmed instructions). For example, memory 210 can include any suitable computer-readable storage media, described below, depending on whether, for example, data access needs to be bi-directional or uni-directional. For example, processor 202 can also directly and very rapidly retrieve and store frequently needed data in a cache memory (not shown).

A removable mass storage device 212 provides additional data storage capacity for the computer system 200, and is coupled either bi-directionally (read/write) or uni-directionally (read only) to processor 202. For example, storage 212 can also include computer-readable media such as magnetic tape, flash memory, PC-CARDS, portable mass storage devices, holographic storage devices, and other storage devices. A fixed mass storage 220 can also, for example, provide additional data storage capacity. The most common example of mass storage 220 is a hard disk drive. Mass storage 212, 220 generally store additional programming instructions, data, and the like that typically are not in active use by the processor 202. It will be appreciated that the information retained within mass storage 212 and 220 can be incorporated, if needed, in standard fashion as part of memory 210 (e.g., RAM) as virtual memory.

In addition to providing processor 202 access to storage subsystems, bus 214 can also be used to provide access to other subsystems and devices. As shown, these can include a display monitor 218, a network interface 216, a keyboard 204, and a pointing device 206, as well as an auxiliary input/output device interface, a sound card, speakers, and other subsystems as needed. For example, the pointing device 206 can be a mouse, stylus, track ball, or tablet, and is useful for interacting with a graphical user interface.

The network interface 216 allows processor 202 to be coupled to another computer, computer network, or telecommunications network using a network connection as shown. For example, through the network interface 216, the processor 202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 202 can be used to connect the computer system 200 to an external network and transfer data according to standard protocols. For example, various process embodiments disclosed herein can be executed on processor 202, or can be performed across a network such as the Internet, intranet networks, or local area networks, in conjunction with a remote processor that shares a portion of the processing. Additional mass storage devices (not shown) can also be connected to processor 202 through network interface 216.

An auxiliary I/O device interface (not shown) can be used in conjunction with computer system 200. The auxiliary I/O device interface can include general and customized interfaces that allow the processor 202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 214 is illustrative of any interconnection scheme serving to link the subsystems. Other computer architectures having different configurations of subsystems can also be utilized.

Figure 3:
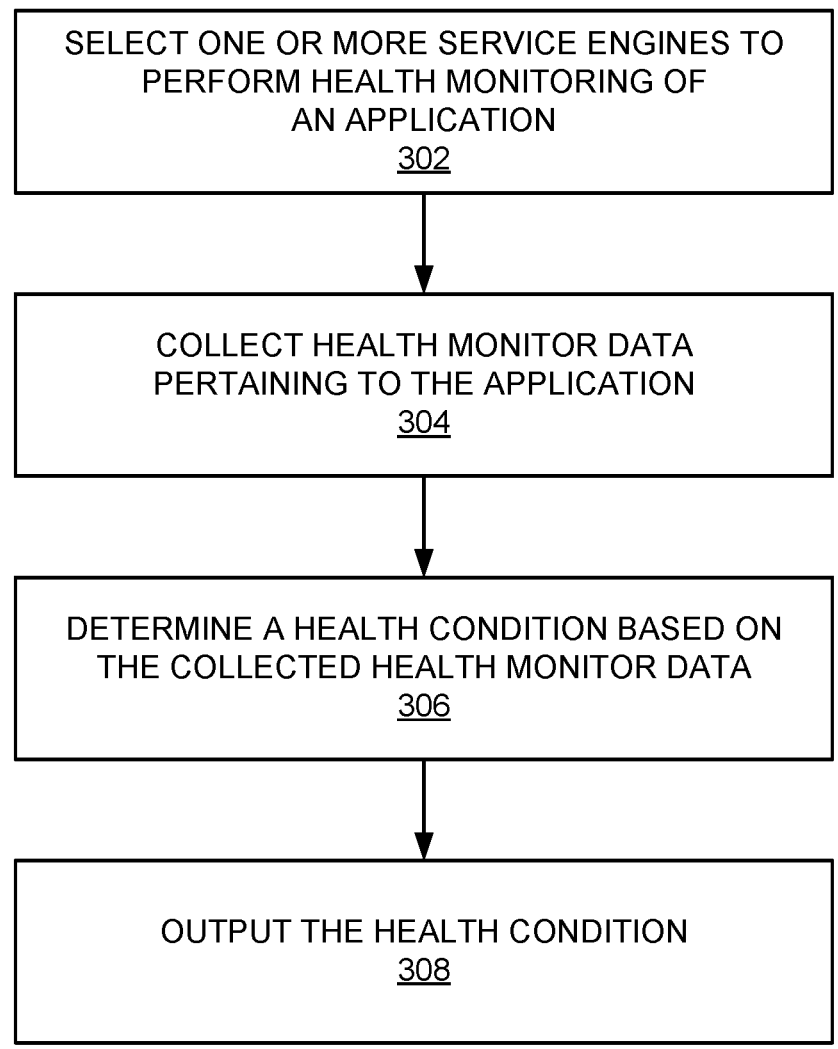
FIG. 3 is a flowchart illustrating an example embodiment of a process for determining a health condition.

FIG. 3 is a flowchart illustrating an example embodiment of a process for determining a health condition. The process can be performed by a processor. The processor can be embodied in a device such as controller 190 shown in FIG. 1 and/or processor 102 shown in FIG. 2.

At 302, one or more service engines are selected to perform health monitoring of an application. The application may be implemented by an application server executing VMs, container, etc. The service engine(s) selected to perform health monitoring can be strategically determined to reduce the load on the applications being monitored compared with conventional monitoring techniques. For example, process 300 spreads the load of health monitoring of a large number of application servers across agents (e.g., service engines) running in each physical node. In various embodiments, the service engine in the same node as the application for which health monitoring is desired is selected. Service engines in other nodes may also be selected. The number of selected service engines can be relatively small. For example, the number of service engines selected to perform health monitoring is less than the total number of service engines in the system environment. In various embodiments, the selection of the subset of service engines on the other nodes ensures that network connectivity is checked in a sampled manner from several nodes such that the report is both accurate and generated in a computationally efficient manner. In various embodiments, the set of nodes selected to perform health monitoring varies based on the service (e.g., a load balancing function such as a virtual service). For example, suppose 10 applications are deployed in a system of 100 service engines in which one service engine is local to an application and one service engine remote from the application is chosen. Using the techniques described here, only up to a threshold number (e.g., 20) service engines performs a health-check.

The selection of service engines can be based on one or more of the following factors: load, coverage, a probabilistic function, timing, and/or other factors. The factors further described herein address scalability challenges in monitoring the health of a large number of application servers. Applications may become overwhelmed when numerous service engines check the applications if the applications were required to respond individually to each request by the service engine for the health status. Here, the number and specific ones of service engines designated to perform health monitoring are selected such that the load of health monitoring is distributed among several nodes and application servers are not overwhelmed.

In various embodiments, the selection of a service engine is based on a load of the service engine. For example, a load-based decision compares a load on a service engine with a load threshold. If the load meets the threshold, the service engine is selected to perform monitoring. For example, a relatively lightly-loaded service engine (e.g., as measured against a threshold) is selected to perform monitoring. The load of the service engine used for comparison may be a current load, a load during a pre-defined time period, historical load, average load over a time period, and the like.

In another embodiment, the selection of a service engine is based on coverage of the service engine. For example, a coverage-based decision considers how many application servers the service engine is currently monitoring. If the service engine is able to accommodate monitoring of additional applications without suffering from performance degradation (e.g., the number of applications currently being monitored is less than a threshold number of applications, etc.), the service engine is assigned to monitor one or more additional applications.

In another embodiment, the selection of a service engine is based on a probabilistic function. For example, each member node (e.g., service engine) calculates a probabilistic distribution of health monitoring. The probabilistic determination may be made by a service engine about whether it will perform monitoring. The probabilistic function predicts those service engines that have more capacity to perform health monitoring at a given time and select the service engine accordingly.

A variety of probabilistic functions may be used. For example, the probability that a particular service engine is to monitor an application can be selected to achieve a desired system wide characteristic (SWC). Suppose n is a number of service engines ("SE"), p is an independent probability of health monitoring an application on a service engine, and q=1−p, i.e., a probability of not health monitoring an application on a SE.

In some embodiments, the probability p can be selected so as to arrive at different System Wide Characteristics (i.e., SWC) across all SEs as follows. $SWC_1$, i.e., a probability of at least one service engine performing health monitoring=$1-q^n$. $SWC_2$, i.e., a probability of k service engines performing health monitoring=$f(k)={}^nC_k * p^k * q^{(n-k)}$. $SWC_3$, i.e., a probability of at least m service engines performing health monitoring $$= \sum_{m}^{n} f(k).$$

$SWC_4$, i.e., a probability of at least $m_1$ service engines and at most $m_2$ service engines performing health monitoring $$= \sum_{m1}^{m2} f(k).$$

The value of p, i.e., an independent probability of health monitoring an application on a service, can be determined by comparing an SWC to a probability threshold T and solving for p to a desired precision. A service engine can independently and probabilistically determine whether it needs to health monitor a service by generating a number x between 0 and 1 and health monitor the application if x is less than p.

In some embodiments, a service engine can repeatedly and independently (with respect to other service engines) determine whether to health monitor based on a computed probability p. In one aspect, while the set of service engines that health monitor can continuously vary over any period of time, the overall probability of requisite number of service engines health monitoring remains constant and a desired SWC is maintained.

In some embodiments, the system can transition from one SWC to another by instructing the service engines to re-compute p and use the newly determined p to independently determine whether to health monitor. For example, the SWC can be changed from $SWC_1$ to $SWC_4$ if the service being monitored is anticipated to undergo a period of instability.

At 304, health monitor data pertaining to the application is collected from the selected service engines. The health monitor data may be collected using existing networking APIs (such as APIs provided by the operating system). The operating system associated with a particular service engine implements the networking API calls (e.g., API calls to send data to or receive data from a specific socket at an IP address). For example, the health monitor data includes operational data (e.g., numbers of open connections, number of requests made to servers, etc.). In various embodiments, the health monitor data may be processed and/or filtered after collection prior to storage or transmission. In various embodiments, health monitor data is collected at pre-defined time intervals, e.g., periodic or non-periodic.

Conventionally, all service engines monitor applications simultaneously, thus duplicating work and increasing processing load. For example, suppose there are i service engines in a system and the monitoring interval is every j seconds. In this example, a service engine queries an application server being monitored every j seconds to gather health data. Typically, in conventional systems, each of the i service engines monitors the health of the same application server every j seconds. Effectively, there are i sets of health monitoring results generated every j seconds for the monitored application, the i sets often being duplicative of one another.

According to techniques of the present disclosure, monitoring is performed in a staggered fashion to minimize duplicative monitoring or optimize monitoring. In one aspect, this decreases processing load while achieving accuracy compared with conventional methods. Using the example of i service engines in a system and the monitoring interval is every j seconds, in various embodiments, each of the i service engines is assigned a random start time and each of the service engines performs monitoring every j seconds. The random start time defines when the service engine is to begin monitoring. In various embodiments, the randomization of the start times effectively staggers monitoring between service engines, which reduces duplicative monitoring.

In various embodiments, the start time for a particular service engine is determined systematically. For example, a service engine is selected periodically or after a threshold time has elapsed since the service engine was previously selected. The service engines may be selected in a round-robin fashion based on time. For example, a service engine may be assigned to perform monitoring at predetermined intervals, e.g., every second or fraction of a second. In one aspect, an application server is not overwhelmed by a large number of service engines performing health checks under this scheme because the service engines take turns performing the health checks based on time. In another aspect, time-based selection of service engine(s) ensures a more thorough connectivity check compared with relying on a single service engine to perform health monitoring. In various embodiments, these techniques provide more thorough coverage of networking paths compared with typical conventional health monitoring. In various embodiments, the collected health monitor data is stored in a shared database such as storage 180 shown in FIG. 1. Examples of collecting health monitor data based on time are described herein in FIGS. 6A-6C.

At 306, a health condition is determined based on the collected health monitor data. The health condition may represent an operational status, state, and/or characteristics of a system such as clustered environment. The health condition indicates the health of at least a portion of the application servers. In various embodiments, the health condition is determined based on an aggregation of one or more health states of various application servers, where the aggregation may be based on data stored in a central database. For example, the data may be pushed to a central controller such as controller 190 shown in FIG. 1 and then pushed to hosts of the system. As another example, the data may be stored at a shared database accessible by various devices without the involvement of the central controller.

In some embodiments, the state of the nodes is monitored and used to make subsequent determinations of which service engine(s) is to perform health monitoring such that the health of a specific application server is always checked by at least a few nodes. The health condition also finds application in determining how to auto-scale servers. For example, as the need (e.g., number of connections, amount of computation, etc.) increases, more servers are spawned to meet the need.

The health condition may be determined according to one or more policies. For example, a policy may include at least one rule for determining the health condition based on inputs. For example, the policy may be applied to received data to determine a health condition. The health condition may be a qualitative evaluation, e.g., "good," "fair," and "poor." The health condition may be a quantitative evaluation, e.g., a scale from 0 to 100. By way of non-limiting example, a policy indicates that the health condition of a system is "good" if: all of the hosts are functioning, at least one host is functioning, the local service engine determines that the host is functioning and at least one other service engine determines that the host is functioning. In this example, the policy indicates that the health condition of a system is "fair" if at least one host is functioning, but fewer than a threshold of other hosts are not functioning (e.g., a percentage of total number of hosts such as 50%). The policy may indicate that the health of a condition of a system is "poor" if fewer than a threshold number of hosts are functioning (e.g., less than 50% of hosts are functioning). Other policies may specify different criteria for what is considered "good," "fair," or "poor." For example, where one policy considers at least one host being functional to be "good," another policy considers at least 75% of hosts being functional to be "good."

In various embodiments, a more specific failure scenario may be given. For example, if a local service engine determines that the health of an application is good and a neighbor service engine determines that the health of an application is bad, this may indicate a network problem between the second service engine and the application. As another example, a delay in a response or a bad response from an application indicates misconfiguration of the application or a health problem in the system. In some embodiments, the policies are pre-determined. In some embodiments, the policies are selectable by an administrator.

At 308, the health condition is output. In various embodiments, the output includes transmitting the output to one or more other service engines, broadcasting the output, etc. In various embodiments, the output includes storing the health condition in a shared database accessible by one or more service engines. For example, the health condition is output to storage, output to a monitoring function or application to be rendered on a user interface, etc.

Figure 4:
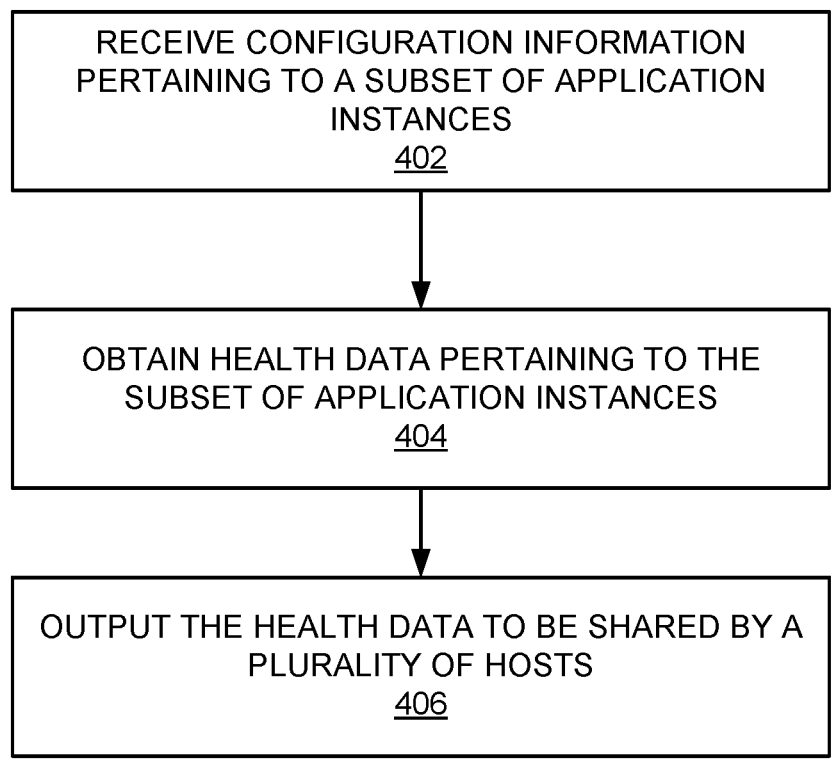
FIG. 4 is a flowchart illustrating an example embodiment of a process for determining a health condition.

FIG. 4 is a flowchart illustrating an example embodiment of a process for determining a health condition. The process can be performed by a processor. The processor can be embodied in a device such as a service engine SE1-SE3 shown in FIG. 1 and/or processor 202 shown in FIG. 2.

At 402, configuration information pertaining to a subset of application instances is received. Configuration information may include instructions regarding how and/or when to perform health monitoring. The configuration information can be specified by the manufacturer or a system administrator in a configuration file. The service engine uses this configuration information to perform health monitoring. The configuration information may be specified according to load, coverage, probabilistic function, timing, and/or other factors. For example, a relatively lightly-loaded service engine may receive configuration information instructing the service engine to perform more frequent monitoring of a particular application instance compared with a relatively heavily-loaded service engine. The selection of service engines, which forms a basis for the configuration information in various embodiments, is further described herein with respect to FIG. 3.

At 404, health data pertaining to the subset of application instances is obtained. The health data may include information about an operational status, state, and/or characteristics of the subset of application instances being monitored (e.g., number of connections, response time from an application, response information from the application, etc.). In various embodiments, the health data is obtained as pre-defined time intervals. The pre-define time intervals may be provided with the configuration information. For example, a service engine is instructed to obtain health data beginning at a start time. The start time assigned to one service engine may be staggered with respect to another service engine. Based on the received instructions, the service engine obtains health data at the defined times.

At 406, the health data to be shared by a plurality of hosts is output. In some embodiments, the health data is output to a shared and/or distributed database such as database 180 shown in FIG. 1. The database may be accessible by one or more other devices, thus the data stored can be shared. In some embodiments, the health data is output to a central controller such as controller 190 shown in FIG. 1. The controller 190 then disseminates the collected information to other service engines.

Figure 5:
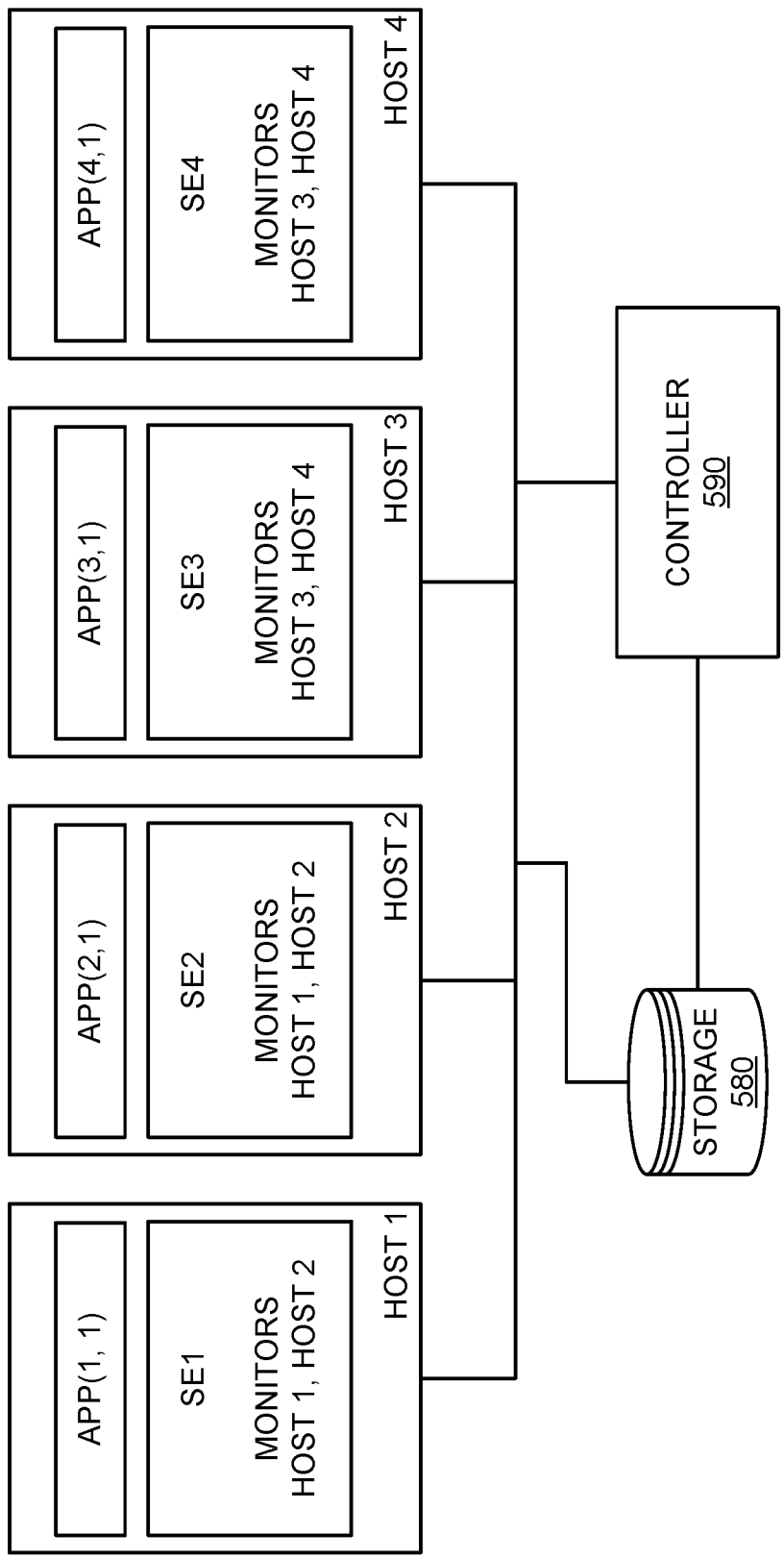
FIG. 5 is a block diagram illustrating an embodiment of a system for monitoring health of constituent components and overall health of the system.

FIG. 5 is a block diagram illustrating an embodiment of a system 500 for monitoring health of constituent components and overall health of the system. The system includes a plurality of hosts Host 1, Host 2, Host 3, and Host 4, storage 580, and controller 590. An example of a host is described herein with respect to 102 shown in FIG. 1. An example of storage 580 is described herein with respect to 180 shown in FIG. 1. An example of controller 590 is described herein with respect to 190 shown in FIG. 1.

System 500 includes four instances of an application, each instance provided in a respective one of Host 1, Host 2, Host 3, and Host 4. Instance App(1,1) is provided in host 1, instance App(2,1) is provided in host 2, instance App(3,1) is provided in host 3, and instance app (4,1) is provided in host 4. In various embodiments, each application instance is provided in a particular host having an associated virtual service. For example, instance App(1,1) is associated with service engine SE1 because they share a host. The virtual service services the respective application instance (also referred to as app). For example, each service engine (SE) performs health-monitoring for the app co-located in the same host, as well as one or more apps in at least one other host. The selection of which apps are monitored by a particular service engine may be performed according to the process described herein with respect to FIG. 3. In various embodiments, controller 590 performs the process to select the apps that are to be monitored by a particular service engine. In the example shown in FIG. 5, SE1 monitors App(1,1) and App(2,1), SE2 monitors App(1,1) and App(2, 1), SE3 monitors App(3,1) and App(4,1), and SE4 monitors App(3,1) and App (4,1). The health data collected by monitoring may be reported to a shared database 580 and stored by the database. A health condition of system 500 may be determined from a combined result of the health-monitoring state of one or more SEs on one or more hosts.

Figure 6A:
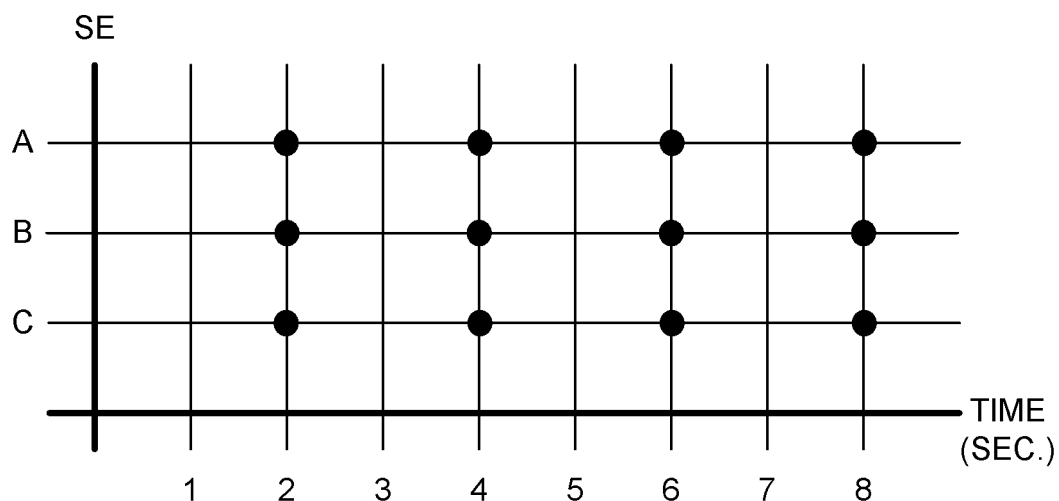
FIG. 6A is a conceptual diagram of periodic health monitoring according to a conventional process.
Figure 6B:
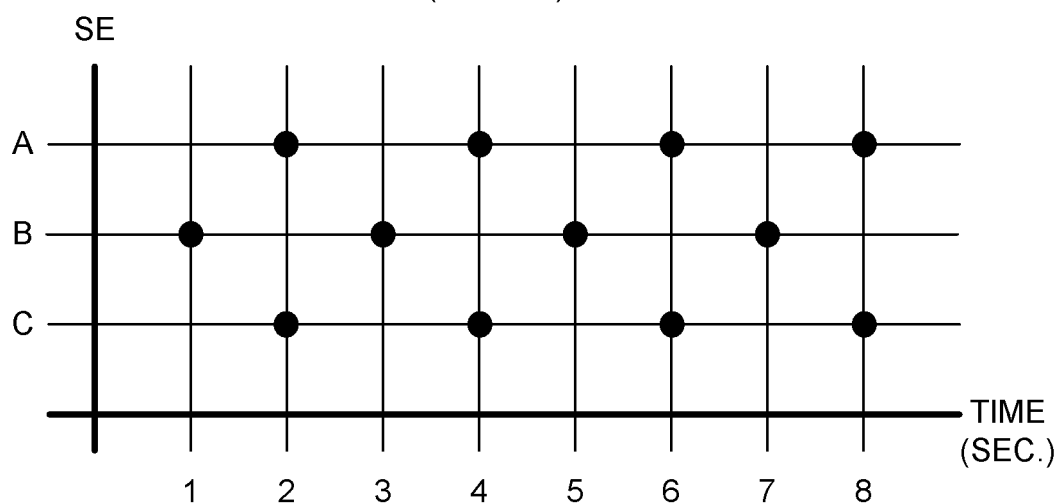
FIG. 6B is a conceptual diagram of periodic health monitoring according to a conventional process.
Figure 6C:
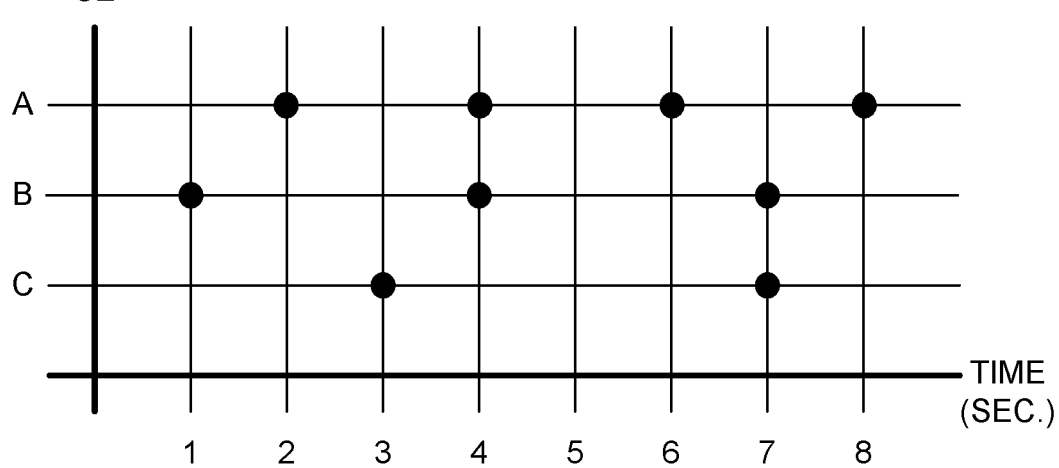
FIG. 6C is a conceptual diagram of periodic health monitoring according to a conventional process.

The conceptual diagram shown in each of FIGS. 6A-6C represents a system of three service engines (A, B, C) that perform monitoring at regular time intervals. In these examples, the x-axis represents time in seconds and the y-axis represents each of the service engines. When a service engine performs health monitoring, this is represented by a darkened circle on the diagram.

FIG. 6A is a conceptual diagram of periodic health monitoring according to a conventional process. The conceptual diagram shown in FIG. 6A represents a system of three service engines (A, B, C) that each perform monitoring every two seconds of a specific application. In this example, the x-axis represents time in seconds and they-axis represents each of the service engines. When a service engine performs health monitoring, this is represented by a darkened circle on the diagram. In the example shown, service engine A performs monitoring at 2 seconds, 4 seconds, 6 seconds, and 8 seconds; service engine B performs monitoring at 2 seconds, 4 seconds, 6 seconds, and 8 seconds; and service engine C performs monitoring at 2 seconds, 4 seconds, 6 seconds, and 8 seconds. In this monitoring scheme, A, B, and C duplicate each other's work because they each monitor the same application at the same points in time. This can also cause strain on the specific application being monitored because three separate queries (from each of service engines A, B, and C) are made to the application. Also, any health issues occurring at 1 second, 3 seconds, 5 seconds, and 7 seconds are not detected because none of the service engines are monitoring at those times.

FIG. 6B is a conceptual diagram of periodic health monitoring according to an embodiment. In the example shown, service engine A performs monitoring at 2 seconds, 4 seconds, 6 seconds, and 8 seconds; service engine B performs monitoring at 1 second, 3 seconds, 5 seconds, and 7 seconds; and service engine C performs monitoring at 2 seconds, 4 seconds, 6 seconds, and 8 seconds. In this monitoring scheme, the start time of monitoring is selected randomly, resulting in service engine B beginning monitoring at 1 second and service engines A and C beginning monitoring at 2 seconds. By staggering the monitoring in this manner, strain on the applications being monitored can be relieved because there are fewer queries (from each of service engines A and C instead of all three service engines) are made compared with conventional monitoring. Because there is at least one service engine performing monitoring at any particular point in time, health issues are not missed. In some instances, depending on the randomization of the start times (e.g., due to coinciding start times), multiple service engines perform monitoring at the same time. This duplication may serve as an error check. For example, service engines A and C perform monitoring at the same time, and the results of their monitoring can be compared with each other to detect if there may be inconsistencies indicative of network problems. For example, A observed good status but C observed poor status, indicating possible network problems between C and the application. As another example, A or C does not report any state, indicting possible network problems with respect to non-reporting service engine. Other random start times and intervals for monitoring are possible. For example, each of the service engines has a different time interval of monitoring.

FIG. 6C is a conceptual diagram of periodic health monitoring according to an embodiment. In the example shown, service engine A performs monitoring at 2 seconds, 4 seconds, 6 seconds, and 8 seconds; service engine B performs monitoring at 1 second, 4 seconds, and 7 seconds; and service engine C performs monitoring at 3 seconds and 7 seconds. In this monitoring scheme, the start time of monitoring is selected randomly, resulting in service engine B beginning monitoring at 1 second and service engine A beginning monitoring at 2 seconds, and C beginning monitoring at 3 seconds. In this example, service A has an interval of monitoring of 2 seconds, service engine B has an interval of monitoring of 3 seconds, and service engine C has an interval of monitoring of 4 seconds. This may further reduce strain on the nodes being polled because there are fewer queries (from each of service engines A and C instead of all three service engines) made compared with conventional monitoring.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for performing health monitoring for a distributed application comprising a plurality of application instances executing on a plurality of physical host devices, a set of physical host devices executing a plurality of service engines to perform a service for the plurality of application instances, the method comprising:
   to reduce load of health-monitoring messages on the plurality of application instances, assigning, from a subset of service engines, different service engines to monitor the health of different sets of application instances, the subset of service engines not including all of the plurality of service engines;
   configuring each service engine in the subset of service engines to send health-monitoring messages to the service engine's assigned set of application instances, wherein at least one particular service engine executing on a particular physical host device sends health-monitoring messages to at least one application instance executing on a physical host device other than the particular physical host device;
   receiving, from each service engine in the subset of service engines, health monitor data pertaining to the application instances to which the service engine sent health-monitoring messages;
   determining a health condition of the distributed application based at least in part on the received health monitor data; and
   outputting the health condition to the plurality of service engines for use by the plurality of service engines to perform the service for the plurality of application instances.

2. The method of claim 1, wherein service engines are selected for inclusion in the subset of service engines based at least in part on a load of each service engine in the plurality of service engines.

3. The method of claim 2 further comprising selecting the subset of service engines by comparing a load of each service engine in the plurality of service engines with a threshold.

4. The method of claim 1, wherein the service engines are selected for inclusion in the subset of service engines based in part on a load of each service engine in the plurality of service engines during a pre-defined time period.

5. The method of claim 1, wherein the service engines are selected for inclusion in the subset of service engines based in part on a coverage of the subset of service engines, the coverage including a number of physical host devices currently being monitored by the subset of service engines.

6. The method of claim 1, wherein the subset of service engines is selected based on a probabilistic function that ensures that the subset includes at least one service engine that is not local to at least one application instance.

7. The method of claim 1, wherein the subset of service engines is selected based on a probabilistic function that predicts whether each service engine in the subset of service engines has capacity to perform health monitoring at a given time.

8. The method of claim 1, wherein the subset of service engines is selected based at least in part on a probabilistic function determined based on a comparison between a predefined system wide characteristic and a probability threshold.

9. The method of claim 1, wherein configuring the service engines comprises configuring the service engines to send the health-monitoring messages in a time-staggered fashion.

10. The method of claim 1, wherein configuring the service engines comprises configuring the service engines to send the health-monitoring messages based on a random start time at which each service engine in the subset begins to collect health monitor data.

11. The method of claim 1, wherein configuring the service engines comprises assigning a first start time to a first service engine in the subset of service engines and assigning a second start time to a second service engine in the subset of service engines, the first start time and the second start time being different from each other.

12. The method of claim 1, wherein service engines not in the selected subset of service engines do not perform health monitoring for the particular application.

13. The method of claim 1, wherein outputting the health condition includes storing the health condition in a shared database accessible by the plurality of service engines.

14. The method of claim 1, wherein determining the health condition includes applying at least one rule to the collected health monitor data and the health condition indicates at least one operational characteristic of at least a portion of the service engines.

15. The method of claim 1, wherein determining the health condition includes applying at least one rule to the collected health monitor data, the at least one rule including whether at least one physical host device is functioning.

16. The method of claim 1, wherein determining the health condition includes applying at least one rule to the collected health monitor data, the at least one rule including whether a local service engine determines that a physical host device is functioning and at least one other service engine determines that the physical host device is functioning.

17. The method of claim 1, wherein determining the health condition includes determining a network problem based on an inconsistency between health monitor data collected by a first service engine in the subset of service engines and health monitor data collected by a second service engine in the subset of service engines.

18. The method of claim 1, wherein:
   the subset of service engines is selected based on a probabilistic function predicting whether a specific service engine in the subset of service engines has capacity to perform health monitoring at a given time;
   sending the health-monitoring messages includes sending the health-monitoring messages from the subset of service engines based on a random start time assigned to at least one service engine in the subset of service engines, the start time defining a time for the at least one service engine in the subset of service engines to begin collecting health monitor data; and outputting the health condition includes sending the health condition to service engines executing on a physical host device other than the physical host device in which the application is provided.

19. A method for performing health monitoring for a distributed application comprising a plurality of application instances executing on a plurality of physical host devices, a set of physical host devices executing a plurality of service engines providing a service for the plurality of application instances, the method comprising:

to reduce a load of health-monitoring messages on the plurality of application instances, receiving, at a first service engine of a first physical host device among the plurality of physical host devices, configuration information pertaining to a subset of application instances to which the first service engine has to send health-monitoring messages, wherein the subset of application instances includes at least one application instance executing on a second physical host device;

obtaining health data pertaining to the subset of application instances; and outputting the health data to be shared by the plurality of service engines, wherein the health data is used along with health data output by a subset of other service engines to determine a health condition of the distributed application.

20. The method of claim 19, wherein health of another subset of application instances is monitored by at least one other service engine executing on a third physical host device among the plurality of physical host devices.

21. The method of claim 19, wherein the configuration information includes instructions indicating when to send health-monitoring messages.

22. A computing device for performing health monitoring for a distributed application comprising a plurality of application instances executing on a plurality of physical host devices, a set of physical host devices executing a plurality of service engines that perform a service for the plurality of application instances, the computing device comprising:

a set of one or more processing units; and a non-transitory machine readable medium storing a program for execution by the set of processors, the program comprising sets of instructions for:

to reduce load of health-monitoring messages on the plurality of application instances, assigning, from a subset of service engines, different service engines to monitor the health of different sets of application instances, the subset of service engines not including all of the plurality of service engines;

configuring each service engine in the subset of service engines to send health-monitoring messages to the service engine's assigned set of application instances, wherein at least one particular service engine executing on a particular physical host device sends health-monitoring messages to at least one application instance executing on a physical host device other than the particular physical host device;

receiving, from each service engine in the subset of service engines, health monitor data pertaining to the application instances to which the service engine sent health-monitoring messages;

determining a health condition of the distributed application based at least in part on the received health monitor data; and outputting the health condition to the plurality of service engines for use by the plurality of service engines to perform the service for the plurality of application instances.

23. A non-transitory machine readable medium storing a program for execution by a set of processing units, the program for performing health monitoring for a distributed application comprising a plurality of application instances executing on a plurality of physical host devices, a set of physical host devices executing a plurality of service engines that perform a service for the plurality of application instances, the program comprising sets of instructions for:

to reduce load of health-monitoring messages on the plurality of application instances, assigning, from a subset of service engines, different service engines to monitor the health of different sets of application instances, the subset of service engines not including all of the plurality of service engines;

configuring each service engine in the subset of service engines to send health-monitoring messages to the service engine's assigned set of application instances, wherein at least one particular service engine executing on a particular physical host device sends health-monitoring messages to at least one application instance executing on a physical host device other than the particular physical host device;

receiving, from each service engine in the subset of service engines, health monitor data pertaining to the application instances to which the service engine sent health-monitoring messages;

determining a health condition of the distributed application based at least in part on the received health monitor data; and outputting the health condition to the plurality of service engines for use by the plurality of service engines to perform the service for the plurality of application instances.

* * * * *